United States Patent
Hack et al.

(10) Patent No.: US 12,183,280 B2
(45) Date of Patent: Dec. 31, 2024

(54) MEANS TO REDUCE OLED TRANSIENT RESPONSE

(71) Applicant: Universal Display Corporation, Ewing, NJ (US)

(72) Inventors: Michael Hack, Carmel, CA (US); Michael Stuart Weaver, Princeton, NJ (US); Nicholas J. Thompson, New Hope, PA (US); Michael O'Connor, Yardley, PA (US)

(73) Assignee: Universal Display Corporation, Ewing, NJ (US)

( * ) Notice: Subject to any disclaimer, the term of this patent is extended or adjusted under 35 U.S.C. 154(b) by 0 days.

(21) Appl. No.: 17/845,125

(22) Filed: Jun. 21, 2022

(65) Prior Publication Data

US 2023/0011754 A1    Jan. 12, 2023

Related U.S. Application Data (60) Provisional application No. 63/339,662, filed on May 9, 2022, provisional application No. 63/249,297, filed
(Continued)

(51) Int. Cl.
G09G 3/3233 (2016.01)

(52) U.S. Cl.
CPC ... G09G 3/3233 (2013.01); *G09G 2300/0452* (2013.01); *G09G 2300/0809* (2013.01);
(Continued)

(58) Field of Classification Search
CPC .................................................. G09G 3/3233
See application file for complete search history.

(56) References Cited

U.S. PATENT DOCUMENTS

| 4,769,292 A | 9/1988 | Tang |
| 5,247,190 A | 9/1993 | Friend |

(Continued)

FOREIGN PATENT DOCUMENTS

| WO | 2008057394 A1 | 5/2008 |
| WO | 2010011390 A2 | 1/2010 |

OTHER PUBLICATIONS

Baldo et al. "Highly efficient phosphorescent emission from organic electroluminescent devices", Nature, vol. 395, pp. 151-154, 1998.
(Continued)

*Primary Examiner* — Dorothy Harris
(74) *Attorney, Agent, or Firm* — Butzel Long (57) ABSTRACT

Embodiments of the disclosed subject matter provide a device that includes an organic light emitting device (OLED), and a drive circuit to control the operation of the OLED, comprising a response time accelerator thin film transistor (TFT) configured to short or reverse bias the OLED for a predetermined period of time during a frame time. Other embodiments include an OLED having a plurality of sub-pixels, where one or more of sub-pixels configured to emit light of at least a first color comprises a first emissive area and a second emissive area that are independently controllable, where the first emissive area is larger than the second emissive area. The controller is configured to control the second emissive area to have (i) a higher brightness, and/or (ii) a higher current density than the first emissive area for a first sub-pixel luminance level that is less than a maximum luminance.

20 Claims, 4 Drawing Sheets

Related U.S. Application Data on Sep. 28, 2021, provisional application No. 63/243,248, filed on Sep. 13, 2021, provisional application No. 63/217,522, filed on Jul. 1, 2021.

(52) U.S. Cl.
CPC ............... *G09G 2320/0233* (2013.01); *G09G 2320/0252* (2013.01); *G09G 2320/0626* (2013.01); *G09G 2330/021* (2013.01)

(56) References Cited

U.S. PATENT DOCUMENTS

| | | |
|---|---|---|
| 5,703,436 A | 12/1997 | Forrest |
| 5,707,745 A | 1/1998 | Forrest |
| 5,834,893 A | 11/1998 | Bulovic |
| 5,844,363 A | 12/1998 | Gu |
| 6,013,982 A | 1/2000 | Thompson |
| 6,087,196 A | 7/2000 | Sturm |
| 6,091,195 A | 7/2000 | Forrest |
| 6,097,147 A | 8/2000 | Baldo |
| 6,294,398 B1 | 9/2001 | Kim |
| 6,303,238 B1 | 10/2001 | Thompson |
| 6,337,102 B1 | 1/2002 | Forrest |
| 6,468,819 B1 | 10/2002 | Kim |
| 6,537,688 B2 | 3/2003 | Silvernail |
| 6,596,443 B2 | 7/2003 | Weaver |
| 6,597,111 B2 | 7/2003 | Silvernail |
| 6,664,137 B2 | 12/2003 | Weaver |
| 6,714,212 B1* | 3/2004 | Tsuboyama .......... G09G 3/2074 345/695 |
| 6,835,950 B2 | 12/2004 | Brown |
| 6,888,305 B2 | 5/2005 | Weaver |
| 6,888,307 B2 | 5/2005 | Silvernail |
| 6,897,474 B2 | 5/2005 | Brown |
| 7,187,119 B2 | 3/2007 | Weaver |
| 7,279,704 B2 | 10/2007 | Walters |
| 7,431,968 B1 | 10/2008 | Shtein |
| 7,683,534 B2 | 3/2010 | Weaver |
| 7,952,267 B2 | 5/2011 | Satou |
| 7,968,146 B2 | 6/2011 | Wagner |
| 8,115,788 B2* | 2/2012 | Kimura ................ G09G 3/3233 345/694 |
| 10,756,141 B2 | 8/2020 | Hack |
| 2002/0011793 A1* | 1/2002 | Kimura ................ G09G 3/3258 315/169.3 |
| 2002/0047822 A1* | 4/2002 | Senda .................... G09G 3/32 345/90 |
| 2003/0030601 A1* | 2/2003 | Komiya ............... G09G 3/2074 345/76 |
| 2003/0222840 A1* | 12/2003 | Koga ................... G09G 3/3607 345/89 |
| 2003/0230980 A1 | 12/2003 | Forrest |
| 2004/0174116 A1 | 9/2004 | Lu |
| 2005/0007361 A1* | 1/2005 | Fujikura ................ G09G 3/325 345/204 |
| 2005/0068270 A1* | 3/2005 | Awakura .............. G09G 3/3208 345/76 |
| 2006/0092146 A1* | 5/2006 | Johnson ............... G09G 3/3233 345/204 |
| 2007/0075627 A1* | 4/2007 | Kimura ................ H10K 59/351 313/506 |
| 2007/0080905 A1* | 4/2007 | Takahara ............. G09G 3/3258 345/76 |
| 2007/0164664 A1* | 7/2007 | Ludwicki ............. G09G 3/2003 313/504 |
| 2008/0036386 A1* | 2/2008 | Shin ..................... G09G 3/3225 315/169.3 |
| 2008/0049052 A1* | 2/2008 | Akiyama .......... G02F 1/134309 345/694 |
| 2008/0197784 A1* | 8/2008 | Benzarti ............... G09G 3/3233 315/169.3 |
| 2008/0225206 A1* | 9/2008 | Satou ..................... H10K 59/35 349/68 |
| 2010/0053043 A1* | 3/2010 | Sakamoto ............ H10K 59/351 345/77 |
| 2011/0074838 A1* | 3/2011 | Yamamoto ........... G09G 3/3233 345/76 |
| 2012/0280962 A1* | 11/2012 | Kawabe ............... G09G 3/3648 345/211 |
| 2013/0037827 A1* | 2/2013 | Levermore ............ H10K 59/84 257/40 |
| 2017/0039944 A1* | 2/2017 | Ma ....................... G09G 3/3258 |
| 2017/0207420 A1* | 7/2017 | Yang ..................... H10K 71/00 |
| 2017/0229663 A1 | 8/2017 | Tsai |
| 2021/0005138 A1 | 1/2021 | Umezawa |
| 2023/0360594 A1* | 11/2023 | Ikeda ..................... H01L 33/00 |

OTHER PUBLICATIONS

Baldo, et al., "Very high-efficiency green organic light-emitting devices based on electrophosphorescence", Applied Physics Letters, Jul. 5, 1999, 4 pp., vol. 75, No. 1, American Institute of Physics, Melville, NY, USA.

S. Choi et al., Nature Communications vol. 11, Article No. 2732 (2020).

S.T. Lee, et al., "A New Patterning Method for Full-Color Polymer Light-Emitting Devices: Laser Induced Thermal Imaging (LITI)." Proceedings of the Society for Information Display, Digest of Technical Papers, vol. 33(Suppl. 2), Boston, 2002, pp. 784-787.

\* cited by examiner

MEANS TO REDUCE OLED TRANSIENT RESPONSE

CROSS-REFERENCE TO RELATED APPLICATIONS

This application claims priority to U.S. Patent Application Ser. No. 63/217,522, filed Jul. 1, 2021, U.S. Patent Application Ser. No. 63/243,248, filed Sep. 13, 2021, U.S. Patent Application Ser. No. 63/249,297, filed Sep. 28, 2021, and U.S. Patent Application Ser. No. 63/339,662, filed May 9, 2022, the entire contents of each are incorporated herein by reference.

FIELD

The present invention relates to devices and techniques for reducing a turn-off time of organic emissive devices, such as organic light emitting diodes, and devices and techniques including the same.

BACKGROUND

Opto-electronic devices that make use of organic materials are becoming increasingly desirable for a number of reasons. Many of the materials used to make such devices are relatively inexpensive, so organic opto-electronic devices have the potential for cost advantages over inorganic devices. In addition, the inherent properties of organic materials, such as their flexibility, may make them well suited for particular applications such as fabrication on a flexible substrate. Examples of organic opto-electronic devices include organic light emitting diodes/devices (OLEDs), organic phototransistors, organic photovoltaic cells, and organic photodetectors. For OLEDs, the organic materials may have performance advantages over conventional materials. For example, the wavelength at which an organic emissive layer emits light may generally be readily tuned with appropriate dopants.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

One application for phosphorescent emissive molecules is a full color display. Industry standards for such a display call for pixels adapted to emit particular colors, referred to as "saturated" colors. In particular, these standards call for saturated red, green, and blue pixels. Alternatively the OLED can be designed to emit white light. In conventional liquid crystal displays emission from a white backlight is filtered using absorption filters to produce red, green and blue emission. The same technique can also be used with OLEDs. The white OLED can be either a single EML device or a stack structure. Color may be measured using CIE coordinates, which are well known to the art.

As used herein, the term "organic" includes polymeric materials as well as small molecule organic materials that may be used to fabricate organic opto-electronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent or phosphorescent small molecule emitter. A dendrimer may be a "small molecule," and it is believed that all dendrimers currently used in the field of OLEDs are small molecules.

As used herein, "top" means furthest away from the substrate, while "bottom" means closest to the substrate. Where a first layer is described as "disposed over" a second layer, the first layer is disposed further away from substrate. There may be other layers between the first and second layer, unless it is specified that the first layer is "in contact with" the second layer. For example, a cathode may be described as "disposed over" an anode, even though there are various organic layers in between.

As used herein, "solution processable" means capable of being dissolved, dispersed, or transported in and/or deposited from a liquid medium, either in solution or suspension form.

A ligand may be referred to as "photoactive" when it is believed that the ligand directly contributes to the photoactive properties of an emissive material. A ligand may be referred to as "ancillary" when it is believed that the ligand does not contribute to the photoactive properties of an emissive material, although an ancillary ligand may alter the properties of a photoactive ligand.

As used herein, and as would be generally understood by one skilled in the art, a first "Highest Occupied Molecular Orbital" (HOMO) or "Lowest Unoccupied Molecular Orbital" (LUMO) energy level is "greater than" or "higher than" a second HOMO or LUMO energy level if the first energy level is closer to the vacuum energy level. Since ionization potentials (IP) are measured as a negative energy relative to a vacuum level, a higher HOMO energy level corresponds to an IP having a smaller absolute value (an IP that is less negative). Similarly, a higher LUMO energy level corresponds to an electron affinity (EA) having a smaller absolute value (an EA that is less negative). On a conventional energy level diagram, with the vacuum level at the top, the LUMO energy level of a material is higher than the HOMO energy level of the same material. A "higher" HOMO or LUMO energy level appears closer to the top of such a diagram than a "lower" HOMO or LUMO energy level.

As used herein, and as would be generally understood by one skilled in the art, a first work function is "greater than" or "higher than" a second work function if the first work function has a higher absolute value. Because work functions are generally measured as negative numbers relative to vacuum level, this means that a "higher" work function is more negative. On a conventional energy level diagram, with the vacuum level at the top, a "higher" work function is illustrated as further away from the vacuum level in the downward direction. Thus, the definitions of HOMO and LUMO energy levels follow a different convention than work functions.

Layers, materials, regions, and devices may be described herein in reference to the color of light they emit. In general, as used herein, an emissive region that is described as producing a specific color of light may include one or more emissive layers disposed over each other in a stack.

As used herein, a "red" layer, material, region, or device refers to one that emits light in the range of about 580-700 nm or having a highest peak in its emission spectrum in that region. Similarly, a "green" layer, material, region, or device refers to one that emits or has an emission spectrum with a peak wavelength in the range of about 500-600 nm; a "blue" layer, material, or device refers to one that emits or has an emission spectrum with a peak wavelength in the range of about 400-500 nm; and a "yellow" layer, material, region, or device refers to one that has an emission spectrum with a peak wavelength in the range of about 540-600 nm. In some arrangements, separate regions, layers, materials, regions, or devices may provide separate "deep blue" and a "light blue" light. As used herein, in arrangements that provide separate "light blue" and "deep blue", the "deep blue" component refers to one having a peak emission wavelength that is at least about 4 nm less than the peak emission wavelength of the "light blue" component. Typically, a "light blue" component has a peak emission wavelength in the range of about 465-500 nm, and a "deep blue" component has a peak emission wavelength in the range of about 400-470 nm, though these ranges may vary for some configurations. Similarly, a color altering layer refers to a layer that converts or modifies another color of light to light having a wavelength as specified for that color. For example, a "red" color filter refers to a filter that results in light having a wavelength in the range of about 580-700 nm. In general, there are two classes of color altering layers: color filters that modify a spectrum by removing unwanted wavelengths of light, and color changing layers that convert photons of higher energy to lower energy. A component "of a color" refers to a component that, when activated or used, produces or otherwise emits light having a particular color as previously described. For example, a "first emissive region of a first color" and a "second emissive region of a second color different than the first color" describes two emissive regions that, when activated within a device, emit two different colors as previously described.

As used herein, emissive materials, layers, and regions may be distinguished from one another and from other structures based upon light initially generated by the material, layer or region, as opposed to light eventually emitted by the same or a different structure. The initial light generation typically is the result of an energy level change resulting in emission of a photon. For example, an organic emissive material may initially generate blue light, which may be converted by a color filter, quantum dot or other structure to red or green light, such that a complete emissive stack or sub-pixel emits the red or green light. In this case the initial emissive material or layer may be referred to as a "blue" component, even though the sub-pixel is a "red" or "green" component.

In some cases, it may be preferable to describe the color of a component such as an emissive region, sub-pixel, color altering layer, or the like, in terms of 1931 CIE coordinates. For example, a yellow emissive material may have multiple peak emission wavelengths, one in or near an edge of the "green" region, and one within or near an edge of the "red" region as previously described. Accordingly, as used herein, each color term also corresponds to a shape in the 1931 CIE coordinate color space. The shape in 1931 CIE color space is constructed by following the locus between two color points and any additional interior points. For example, interior shape parameters for red, green, blue, and yellow may be defined as shown below:

| Color | CIE Shape Parameters |
| --- | --- |
| Central Red | Locus: [0.6270, 0.3725]; [0.7347, 0.2653]; Interior: [0.5086, 0.2657] |
| Central Green | Locus: [0.0326, 0.3530]; [0.3731, 0.6245]; Interior: [0.2268, 0.3321 |
| Central Blue | Locus: [0.1746, 0.0052]; [0.0326, 0.3530]; Interior: [0.2268, 0.3321] |
| Central Yellow | Locus: [0.373 I, 0.6245]; [0.6270, 0.3725]; Interior: [0.3 700, 0.4087]; [0.2886, 0.4572] |

More details on OLEDs, and the definitions described above, can be found in U.S. Pat. No. 7,279,704, which is incorporated herein by reference in its entirety.

SUMMARY

According to an embodiment, an organic light emitting diode/device (OLED) is also provided. The OLED can include an anode, a cathode, and an organic layer, disposed between the anode and the cathode. According to an embodiment, the organic light emitting device is incorporated into one or more device selected from a consumer product, an electronic component module, and/or a lighting panel.

According to an embodiment, a device may include an organic light emitting device (OLED). The device may include a drive circuit to control the operation of the OLED, having a response time accelerator thin film transistor (TFT) configured to short or reverse bias the OLED for a predetermined period of time during a frame time.

The OLED may have a voltage greater than or equal to zero volts when the response time accelerator TFT shorts or reverse biases the OLED.

The drive control circuit may include a selection thin film transistor (TFT) that is coupled to a data line and a first scan line, and a driver TFT that is coupled to the select TFT and the OLED. The response time accelerator TFT may be connected in parallel to the OLED, and connected in series with the driver TFT, and connected to a second scan line. The response time accelerator TFT may be configured to be energized by a scan line pulse to the second scan line of the device. The second scan line may be a scan line before the first scan line, a scan line after the first scan line, a scan line adjacent to the first scan line, and/or a scan line within a predetermined distance from the first scan line.

The OLED may include one or more pixels, with each pixel having one or more sub-pixels, and the response time accelerator TFT may be configured to decrease luminance of the one or more sub-pixels by shorting, partially shorting, reverse-biasing, or placing a predetermined or controllable low resistance across the OLED.

The OLED may include one or more pixels, with each pixel having one or more sub-pixels, and the response time accelerator TFT may be configured to reduce an amount of light emitted from the one or more sub-pixels when the second scan line is energized.

The response time accelerator TFT may reduce subsequent light output from the OLED after shorting, partially shorting, reverse, or placing a predetermined or controllable low resistance across biasing the OLED for the period it is energized.

The drive circuitry may be configured to control at least one sub-pixel of the OLED that is configured to emit white light, at least one sub-pixel of the OLED configured to emit yellow light, at least one sub-pixel to emit green light, at least one sub-pixel to emit blue light, and/or at least one sub-pixel configured to emit cyan light.

The drive circuitry may be configured to control at least two sub-pixels that include a first sub-pixel configured to emit a light having a first color and a second sub-pixel configured to emit light having a second color.

The drive circuitry may be configured to control at least three sub-pixels that include a first sub-pixel configured to emit a light having a first color, a second sub-pixel configured to emit light having a second color, and a third sub-pixel configured to emit light having a third color.

The OLED may include a plurality of pixels, where each pixel includes a first sub-pixel, a second sub-pixel, and at least one third sub-pixel. The drive circuit may be configured to control a portion of the first sub-pixels of the plurality of pixels to output light.

The drive circuit may include a selection thin film transistor (TFT) that is coupled to a data line and a first scan line, and a driver TFT that is coupled to the select TFT and the OLED. The response time accelerator TFT may be connected in parallel with the driver TFT, may be connected in series with the OLED, connected to a separate power line, and may be connected to a second scan line. The OLED may have a voltage that is greater than or equal to zero volts when the response time accelerator TFT shorts or reverse biases the OLED. The response time accelerator TFT may be configured to be energized by a scan line pulse to the second scan line of the device. The second scan line may be a scan line before the first scan line, a scan line after the first scan line, a scan line adjacent to the first scan line, and/or a scan line within a predetermined distance from the first scan line. The OLED may have a plurality of pixels, where each pixel includes a first sub-pixel, a second sub-pixel, and at least one third sub-pixel, and the drive circuit may be configured to control a portion of the first sub-pixels of the plurality of pixels to output light.

According to an embodiment, a device may include an organic light emitting device (OLED) having a plurality of sub-pixels, where one or more of sub-pixels configured to emit light of at least a first color comprises a first emissive area and a second emissive area that are independently controllable. A controller may be configured to control the first emissive area and the second emissive area, wherein the first emissive area is larger than the second emissive area. The controller may be configured to control the second emissive area to have (i) a higher brightness, and/or (ii) a higher current density than the first emissive area for a first sub-pixel luminance level that is less than a maximum luminance.

At least one sub-pixel of the plurality of sub-pixels may be configured to emit at least one of white light, yellow light, green light, blue light, and/or cyan light.

Each pixel of the plurality of pixels may have at least three sub-pixels, where the emissive areas within each of the at least three sub-pixels are independently controllable. The controller may be configured to control the second emissive area to have a higher brightness than the first emissive area for a first luminance level that is less than a maximum luminance.

Each emissive area within a sub-pixel may use the same emissive layer.

Each emissive layer in the same sub-pixel may be deposited at the same time using the same patterning process.

The device may include a plurality of scan lines, where each emissive area in the same sub-pixel is addressed from a separate scan line of the plurality of scan lines.

The device may include a plurality of data lines, where each emissive area in the same sub-pixel is addressed from a separate data line.

Each emissive area in the same sub-pixel of the device may be powered by its own power supply line. The controller may be configured to control a duty cycle of the power supply line to control when the sub-pixel is turned on.

The second emissive area of the OLED may be powered by a voltage supply which is pulsed with a duty cycle less than 100%.

The first emissive area and the second emissive area of the device may form a total emissive area. The second emissive area may be less than 50%, less than 25%, of the total emissive area, less than 10% of the total emissive area, and/or less than 5% of the total emissive area.

The controller of the device may be configured to control the amount of light output by the OLED, and may be configured to turn off the first emissive area and emit light from the second emissive area when less than a predetermined amount of the maximum luminance.

The controller of the device may be configured to control the first emissive area and the second emissive area to output light above a first percentage of a maximum sub-pixel luminance, configured to control the second emissive area to output light below a second percentage of the maximum sub-pixel luminance, and/or configured to control the first emissive area and the second emissive area to output light at different intensities when between the first percentage and second percentage of maximum luminance. The first percentage of the maximum sub-pixel luminance may be between 10%-100%, and the second percentage of the maximum sub-pixel luminance may be 0-50%.

The controller of the device may be configured to control the first emissive area, and/or the second emissive area of a sub-pixel to be energized for less than a complete frame time.

The device may include a separate power line to the OLED, where the controller may be configured to control to duty cycle to be a less than 100% duty cycle, a less than 50% duty cycle, a less than 25% duty cycle, a less than 10% duty cycle, and/or a less than 5% duty cycle. A first emissive area and/or a second emissive area may be powered by: (i) a constant power supply rail, and/or (ii) the separate power line having the selected duty cycle. For example, in some embodiments, both the first emissive area and the second emissive area may be powered by the separate power line having the selected duty cycle.

Different colors of light may be emitted from the at least two emission areas of a green sub-pixel, a red sub-pixel, and/or a blue sub-pixel.

Different colors may be formed from a different microcavity, one or more color altering layers, and/or quantum dots.

According to an embodiment, a consumer electronic device may have a device including an organic light an organic light emitting device (OLED), and a drive circuit to control the operation of the OLED that includes a response time accelerator thin film transistor (TFT) configured to short or reverse bias the OLED for a predetermined period of time during a frame time to display at least a portion of an image on the device.

The device may be a flat panel display, a curved display, a computer monitor, a medical monitor, a television, a billboard, a light for interior or exterior illumination and/or signaling, a heads-up display, a fully or partially transparent display, a flexible display, a rollable display, a foldable display, a stretchable display, a laser printer, a telephone, a cell phone, tablet, a phablet, a personal digital assistant (PDA), a wearable device, a laptop computer, a digital camera, a camcorder, a viewfinder, a micro-display that is less than 2 inches diagonal, a 3-D display, a virtual reality or augmented reality display, a vehicle, a video walls comprising multiple displays tiled together, a theater or stadium screen, and/or a sign.

DETAILED DESCRIPTION

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

The initial OLEDs used emissive molecules that emitted light from their singlet states ("fluorescence") as disclosed, for example, in U.S. Pat. No. 4,769,292, which is incorporated by reference in its entirety. Fluorescent emission generally occurs in a time frame of less than 10 nanoseconds.

More recently, OLEDs having emissive materials that emit light from triplet states ("phosphorescence") have been demonstrated. Baldo et al., "Highly Efficient Phosphorescent Emission from Organic Electroluminescent Devices," Nature, vol. 395, 151-154, 1998; ("Baldo-I") and Baldo et al., "Very high-efficiency green organic light-emitting devices based on electrophosphorescence," Appl. Phys. Lett., vol. 75, No. 3, 4-6 (1999) ("Baldo-II"), are incorporated by reference in their entireties. Phosphorescence is described in more detail in U.S. Pat. No. 7,279,704 at cols. 5-6, which are incorporated by reference.

Figure 1:
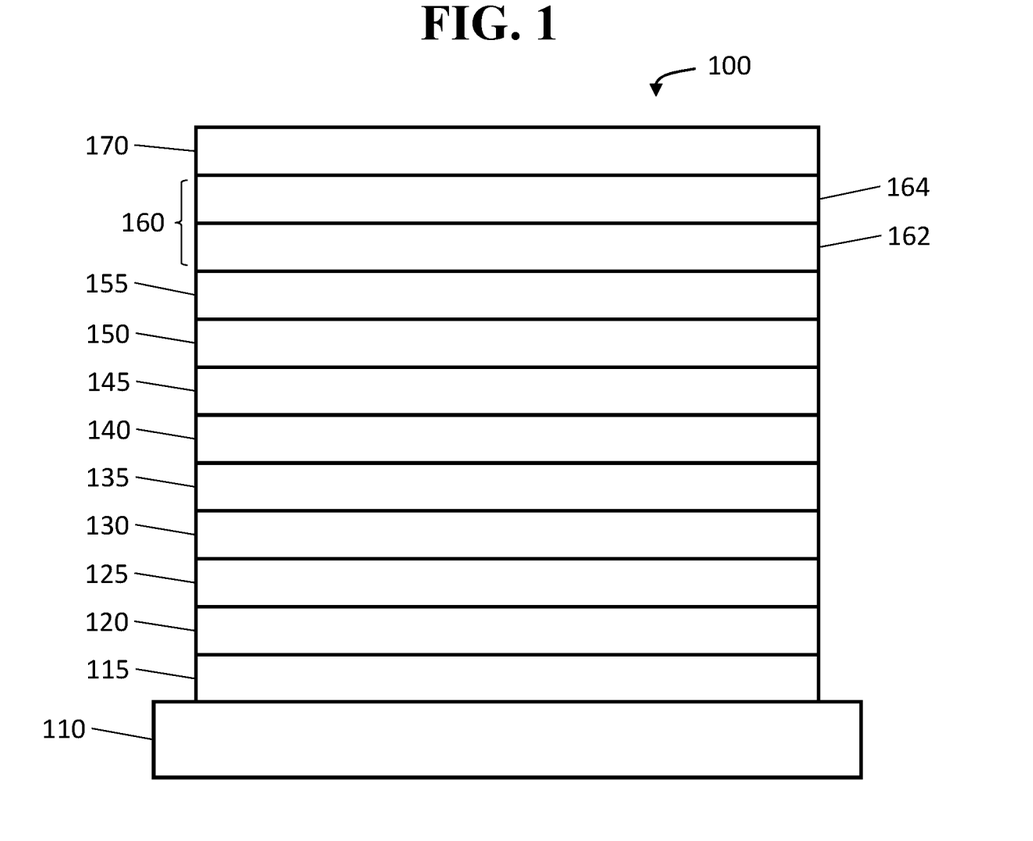
FIG. 1 shows an organic light emitting device.

FIG. 1 shows an organic light emitting device 100. The figures are not necessarily drawn to scale. Device 100 may include a substrate 110, an anode 115, a hole injection layer 120, a hole transport layer 125, an electron blocking layer 130, an emissive layer 135, a hole blocking layer 140, an electron transport layer 145, an electron injection layer 150, a protective layer 155, a cathode 160, and a barrier layer 170. Cathode 160 is a compound cathode having a first conductive layer 162 and a second conductive layer 164. Device 100 may be fabricated by depositing the layers described, in order. The properties and functions of these various layers, as well as example materials, are described in more detail in U.S. Pat. No. 7,279,704 at cols. 6-10, which are incorporated by reference.

More examples for each of these layers are available. For example, a flexible and transparent substrate-anode combination is disclosed in U.S. Pat. No. 5,844,363, which is incorporated by reference in its entirety. An example of a p-doped hole transport layer is m-MTDATA doped with $F_4$-TCNQ at a molar ratio of 50:1, as disclosed in U.S. Patent Application Publication No. 2003/0230980, which is incorporated by reference in its entirety. Examples of emissive and host materials are disclosed in U.S. Pat. No. 6,303,238 to Thompson et al., which is incorporated by reference in its entirety. An example of an n-doped electron transport layer is Bphen doped with Li at a molar ratio of 1:1, as disclosed in U.S. Patent Application Publication No. 2003/0230980, which is incorporated by reference in its entirety. U.S. Pat. Nos. 5,703,436 and 5,707,745, which are incorporated by reference in their entireties, disclose examples of cathodes including compound cathodes having a thin layer of metal such as Mg:Ag with an overlying transparent, electrically-conductive, sputter-deposited ITO layer. The theory and use of blocking layers is described in more detail in U.S. Pat. No. 6,097,147 and U.S. Patent Application Publication No. 2003/0230980, which are incorporated by reference in their entireties. Examples of injection layers are provided in U.S. Patent Application Publication No. 2004/0174116, which is incorporated by reference in its entirety. Barrier layer 170 may be a single- or multi-layer barrier and may cover or surround the other layers of the device. The barrier layer 170 may also surround the substrate 110, and/or it may be arranged between the substrate and the other layers of the device. The barrier also may be referred to as an encapsulant, encapsulation layer, protective layer, or permeation barrier, and typically provides protection against permeation by moisture, ambient air, and other similar materials through to the other layers of the device. Examples of barrier layer materials and structures are provided in U.S. Pat. Nos. 6,537,688, 6,597,111, 6,664,137, 6,835,950, 6,888,305, 6,888,307, 6,897,474, 7,187,119, and 7,683,534, each of which is incorporated by reference in its entirety.

Figure 2:
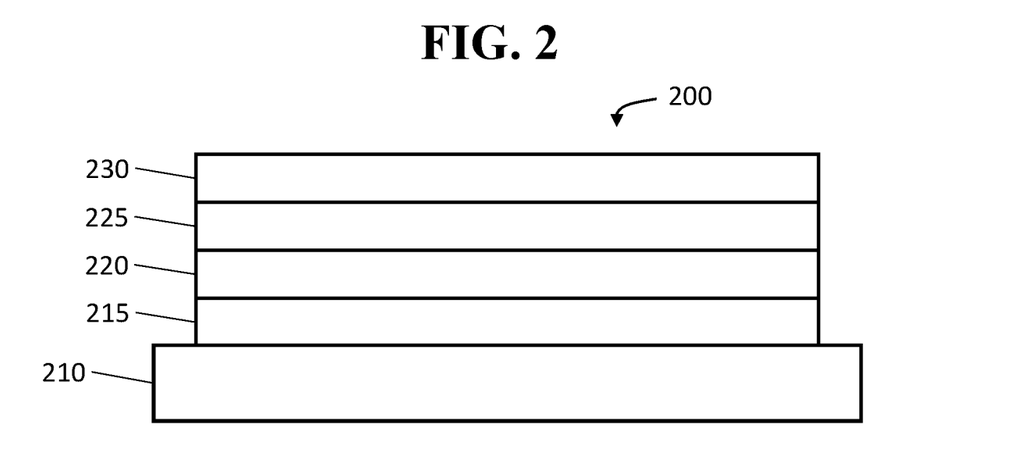
FIG. 2 shows an inverted organic light emitting device that does not have a separate electron transport layer.

FIG. 2 shows an inverted OLED 200. The device includes a substrate 210, a cathode 215, an emissive layer 220, a hole transport layer 225, and an anode 230. Device 200 may be fabricated by depositing the layers described, in order. Because the most common OLED configuration has a cathode disposed over the anode, and device 200 has cathode 215 disposed under anode 230, device 200 may be referred to as an "inverted" OLED. Materials similar to those described with respect to device 100 may be used in the corresponding layers of device 200. FIG. 2 provides one example of how some layers may be omitted from the structure of device 100.

The simple layered structure illustrated in FIGS. 1 and 2 is provided by way of non-limiting example, and it is understood that embodiments of the invention may be used in connection with a wide variety of other structures. The specific materials and structures described are exemplary in nature, and other materials and structures may be used. Functional OLEDs may be achieved by combining the various layers described in different ways, or layers may be omitted entirely, based on design, performance, and cost factors. Other layers not specifically described may also be included. Materials other than those specifically described may be used. Although many of the examples provided herein describe various layers as comprising a single material, it is understood that combinations of materials, such as a mixture of host and dopant, or more generally a mixture, may be used. Also, the layers may have various sublayers. The names given to the various layers herein are not intended to be strictly limiting. For example, in device 200, hole transport layer 225 transports holes and injects holes into emissive layer 220, and may be described as a hole transport layer or a hole injection layer. In one embodiment, an OLED may be described as having an "organic layer" disposed between a cathode and an anode. This organic layer may comprise a single layer, or may further comprise multiple layers of different organic materials as described, for example, with respect to FIGS. 1 and 2.

Structures and materials not specifically described may also be used, such as OLEDs comprised of polymeric materials (PLEDs) such as disclosed in U.S. Pat. No. 5,247,190 to Friend et al., which is incorporated by reference in its entirety. By way of further example, OLEDs having a single organic layer may be used. OLEDs may be stacked, for example as described in U.S. Pat. No. 5,707,745 to Forrest et al, which is incorporated by reference in its entirety. The OLED structure may deviate from the simple layered structure illustrated in FIGS. 1 and 2. For example, the substrate may include an angled reflective surface to improve outcoupling, such as a mesa structure as described in U.S. Pat. No. 6,091,195 to Forrest et al., and/or a pit structure as described in U.S. Pat. No. 5,834,893 to Bulovic et al., which are incorporated by reference in their entireties.

In some embodiments disclosed herein, emissive layers or materials, such as emissive layer 135 and emissive layer 220 shown in FIGS. 1-2, respectively, may include quantum dots. An "emissive layer" or "emissive material" as disclosed herein may include an organic emissive material and/or an emissive material that contains quantum dots or equivalent structures, unless indicated to the contrary explicitly or by context according to the understanding of one of skill in the art. In general, an emissive layer includes emissive material within a host matrix. Such an emissive layer may include only a quantum dot material which converts light emitted by a separate emissive material or other emitter, or it may also include the separate emissive material or other emitter, or it may emit light itself directly from the application of an electric current. Similarly, a color altering layer, color filter, upconversion, or downconversion layer or structure may include a material containing quantum dots, though such layer may not be considered an "emissive layer" as disclosed herein. In general, an "emissive layer" or material is one that emits an initial light based on an injected electrical charge, where the initial light may be altered by another layer such as a color filter or other color altering layer that does not itself emit an initial light within the device, but may re-emit altered light of a different spectra content based upon absorption of the initial light emitted by the emissive layer and downconversion to a lower energy light emission. In some embodiments disclosed herein, the color altering layer, color filter, upconversion, and/or downconversion layer may be disposed outside of an OLED device, such as above or below an electrode of the OLED device.

Unless otherwise specified, any of the layers of the various embodiments may be deposited by any suitable method. For the organic layers, preferred methods include thermal evaporation, ink-jet, such as described in U.S. Pat. Nos. 6,013,982 and 6,087,196, which are incorporated by reference in their entireties, organic vapor phase deposition (OVPD), such as described in U.S. Pat. No. 6,337,102 to Forrest et al., which is incorporated by reference in its entirety, and deposition by organic vapor jet printing (OVJP), such as described in U.S. Pat. No. 7,431,968, which is incorporated by reference in its entirety. Other suitable deposition methods include spin coating and other solution based processes. Solution based processes are preferably carried out in nitrogen or an inert atmosphere. For the other layers, preferred methods include thermal evaporation. Preferred patterning methods include deposition through a mask, cold welding such as described in U.S. Pat. Nos. 6,294,398 and 6,468,819, which are incorporated by reference in their entireties, and patterning associated with some of the deposition methods such as ink-jet and OVJD. Other methods may also be used. The materials to be deposited may be modified to make them compatible with a particular deposition method. For example, substituents such as alkyl and aryl groups, branched or unbranched, and preferably containing at least 3 carbons, may be used in small molecules to enhance their ability to undergo solution processing. Substituents having 20 carbons or more may be used, and 3-20 carbons is a preferred range. Materials with asymmetric structures may have better solution processibility than those having symmetric structures, because asymmetric materials may have a lower tendency to recrystallize. Dendrimer substituents may be used to enhance the ability of small molecules to undergo solution processing.

Devices fabricated in accordance with embodiments of the present invention may further optionally comprise a barrier layer. One purpose of the barrier layer is to protect the electrodes and organic layers from damaging exposure to harmful species in the environment including moisture, vapor and/or gases, etc. The barrier layer may be deposited over, under or next to a substrate, an electrode, or over any other parts of a device including an edge. The barrier layer may comprise a single layer, or multiple layers. The barrier layer may be formed by various known chemical vapor deposition techniques and may include compositions having a single phase as well as compositions having multiple phases. Any suitable material or combination of materials may be used for the barrier layer. The barrier layer may incorporate an inorganic or an organic compound or both. The preferred barrier layer comprises a mixture of a polymeric material and a non-polymeric material as described in U.S. Pat. No. 7,968,146, PCT Pat. Application Nos. PCT/US2007/023098 and PCT/US2009/042829, which are herein incorporated by reference in their entireties. To be considered a "mixture", the aforesaid polymeric and non-polymeric materials comprising the barrier layer should be deposited under the same reaction conditions and/or at the same time. The weight ratio of polymeric to non-polymeric material may be in the range of 95:5 to 5:95. The polymeric material and the non-polymeric material may be created from the same precursor material. In one example, the mixture of a polymeric material and a non-polymeric material consists essentially of polymeric silicon and inorganic silicon.

In some embodiments, at least one of the anode, the cathode, or a new layer disposed over the organic emissive layer functions as an enhancement layer. The enhancement layer comprises a plasmonic material exhibiting surface plasmon resonance that non-radiatively couples to the emitter material and transfers excited state energy from the emitter material to non-radiative mode of surface plasmon polariton. The enhancement layer is provided no more than a threshold distance away from the organic emissive layer, wherein the emitter material has a total non-radiative decay rate constant and a total radiative decay rate constant due to the presence of the enhancement layer and the threshold distance is where the total non-radiative decay rate constant is equal to the total radiative decay rate constant. In some embodiments, the OLED further comprises an outcoupling layer. In some embodiments, the outcoupling layer is disposed over the enhancement layer on the opposite side of the organic emissive layer. In some embodiments, the outcoupling layer is disposed on opposite side of the emissive layer from the enhancement layer but still outcouples energy from the surface plasmon mode of the enhancement layer. The outcoupling layer scatters the energy from the surface plasmon polaritons. In some embodiments this energy is scattered as photons to free space. In other embodiments, the energy is scattered from the surface plasmon mode into other modes of the device such as but not limited to the organic waveguide mode, the substrate mode, or another waveguiding mode. If energy is scattered to the non-free space mode of the OLED other outcoupling schemes could be incorporated to extract that energy to free space. In some embodiments, one or more intervening layer can be disposed between the enhancement layer and the outcoupling layer. The examples for intervening layer(s) can be dielectric materials, including organic, inorganic, perovskites, oxides, and may include stacks and/or mixtures of these materials.

The enhancement layer modifies the effective properties of the medium in which the emitter material resides resulting in any or all of the following: a decreased rate of emission, a modification of emission line-shape, a change in emission intensity with angle, a change in the stability of the emitter material, a change in the efficiency of the OLED, and reduced efficiency roll-off of the OLED device. Placement of the enhancement layer on the cathode side, anode side, or on both sides results in OLED devices which take advantage of any of the above-mentioned effects. In addition to the specific functional layers mentioned herein and illustrated in the various OLED examples shown in the figures, the OLEDs according to the present disclosure may include any of the other functional layers often found in OLEDs.

The enhancement layer can be comprised of plasmonic materials, optically active metamaterials, or hyperbolic metamaterials. As used herein, a plasmonic material is a material in which the real part of the dielectric constant crosses zero in the visible or ultraviolet region of the electromagnetic spectrum. In some embodiments, the plasmonic material includes at least one metal. In such embodiments the metal may include at least one of Ag, Al, Au, Ir, Pt, Ni, Cu, W, Ta, Fe, Cr, Mg, Ga, Rh, Ti, Ru, Pd, In, Bi, Ca alloys or mixtures of these materials, and stacks of these materials. In general, a metamaterial is a medium composed of different materials where the medium as a whole acts differently than the sum of its material parts. In particular, we define optically active metamaterials as materials which have both negative permittivity and negative permeability. Hyperbolic metamaterials, on the other hand, are anisotropic media in which the permittivity or permeability are of different sign for different spatial directions. Optically active metamaterials and hyperbolic metamaterials are strictly distinguished from many other photonic structures such as Distributed Bragg Reflectors ("DBRs") in that the medium should appear uniform in the direction of propagation on the length scale of the wavelength of light. Using terminology that one skilled in the art can understand: the dielectric constant of the metamaterials in the direction of propagation can be described with the effective medium approximation. Plasmonic materials and metamaterials provide methods for controlling the propagation of light that can enhance OLED performance in a number of ways.

In some embodiments, the enhancement layer is provided as a planar layer. In other embodiments, the enhancement layer has wavelength-sized features that are arranged periodically, quasi-periodically, or randomly, or sub-wavelength-sized features that are arranged periodically, quasi-periodically, or randomly. In some embodiments, the wavelength-sized features and the sub-wavelength-sized features have sharp edges.

In some embodiments, the outcoupling layer has wavelength-sized features that are arranged periodically, quasi-periodically, or randomly, or sub-wavelength-sized features that are arranged periodically, quasi-periodically, or randomly. In some embodiments, the outcoupling layer may be composed of a plurality of nanoparticles and in other embodiments the outcoupling layer is composed of a plurality of nanoparticles disposed over a material. In these embodiments the outcoupling may be tunable by at least one of varying a size of the plurality of nanoparticles, varying a shape of the plurality of nanoparticles, changing a material of the plurality of nanoparticles, adjusting a thickness of the material, changing the refractive index of the material or an additional layer disposed on the plurality of nanoparticles, varying a thickness of the enhancement layer, and/or varying the material of the enhancement layer. The plurality of nanoparticles of the device may be formed from at least one of metal, dielectric material, semiconductor materials, an alloy of metal, a mixture of dielectric materials, a stack or layering of one or more materials, and/or a core of one type of material and that is coated with a shell of a different type of material. In some embodiments, the outcoupling layer is composed of at least metal nanoparticles wherein the metal is selected from the group consisting of Ag, Al, Au, Ir, Pt, Ni, Cu, W, Ta, Fe, Cr, Mg, Ga, Rh, Ti, Ru, Pd, In, Bi, Ca, alloys or mixtures of these materials, and stacks of these materials. The plurality of nanoparticles may have additional layer disposed over them. In some embodiments, the polarization of the emission can be tuned using the outcoupling layer. Varying the dimensionality and periodicity of the outcoupling layer can select a type of polarization that is preferentially outcoupled to air. In some embodiments the outcoupling layer also acts as an electrode of the device.

It is believed that the internal quantum efficiency (IQE) of fluorescent OLEDs can exceed the 25% spin statistics limit through delayed fluorescence. As used herein, there are two types of delayed fluorescence, i.e. P-type delayed fluorescence and E-type delayed fluorescence. P-type delayed fluorescence is generated from triplet-triplet annihilation (TTA).

On the other hand, E-type delayed fluorescence does not rely on the collision of two triplets, but rather on the thermal population between the triplet states and the singlet excited states. Compounds that are capable of generating E-type delayed fluorescence are required to have very small singlet-triplet gaps. Thermal energy can activate the transition from the triplet state back to the singlet state. This type of delayed fluorescence is also known as thermally activated delayed fluorescence (TADF). A distinctive feature of TADF is that the delayed component increases as temperature rises due to the increased thermal energy. If the reverse intersystem crossing rate is fast enough to minimize the non-radiative decay from the triplet state, the fraction of back populated singlet excited states can potentially reach 75%. The total singlet fraction can be 100%, far exceeding the spin statistics limit for electrically generated excitons.

E-type delayed fluorescence characteristics can be found in an exciplex system or in a single compound. Without being bound by theory, it is believed that E-type delayed fluorescence requires the luminescent material to have a small singlet-triplet energy gap ($\Delta E_{S-T}$). Organic, non-metal containing, donor-acceptor luminescent materials may be able to achieve this. The emission in these materials is often characterized as a donor-acceptor charge-transfer (CT) type emission. The spatial separation of the HOMO and LUMO in these donor-acceptor type compounds often results in small $\Delta E_{S-T}$. These states may involve CT states. Often, donor-acceptor luminescent materials are constructed by connecting an electron donor moiety such as amino- or carbazole-derivatives and an electron acceptor moiety such as N-containing six-membered aromatic ring.

Devices fabricated in accordance with embodiments of the invention can be incorporated into a wide variety of electronic component modules (or units) that can be incorporated into a variety of electronic products or intermediate components. Examples of such electronic products or intermediate components include display screens, lighting devices such as discrete light source devices or lighting panels, etc. that can be utilized by the end-user product manufacturers. Such electronic component modules can optionally include the driving electronics and/or power source(s). Devices fabricated in accordance with embodiments of the invention can be incorporated into a wide variety of consumer products that have one or more of the electronic component modules (or units) incorporated therein. A consumer product comprising an OLED that includes the compound of the present disclosure in the organic layer in the OLED is disclosed. Such consumer products would include any kind of products that include one or more light source(s) and/or one or more of some type of visual displays. Some examples of such consumer products include a flat panel display, a curved display, a computer monitor, a medical monitor, a television, a billboard, a light for interior or exterior illumination and/or signaling, a heads-up display, a fully or partially transparent display, a flexible display, a rollable display, a foldable display, a stretchable display, a laser printer, a telephone, a cell phone, tablet, a phablet, a personal digital assistant (PDA), a wearable device, a laptop computer, a digital camera, a camcorder, a viewfinder, a micro-display that is less than 2 inches diagonal, a 3-D display, a virtual reality or augmented reality display, a vehicle, a video walls comprising multiple displays tiled together, a theater or stadium screen, and a sign. Various control mechanisms may be used to control devices fabricated in accordance with the present invention, including passive matrix and active matrix. Many of the devices are intended for use in a temperature range comfortable to humans, such as 18 C to 30 C, and more preferably at room temperature (20-25 C), but could be used outside this temperature range, for example, from −40 C to 80 C.

The materials and structures described herein may have applications in devices other than OLEDs. For example, other optoelectronic devices such as organic solar cells and organic photodetectors may employ the materials and structures. More generally, organic devices, such as organic transistors, may employ the materials and structures.

In some embodiments, the OLED has one or more characteristics selected from the group consisting of being flexible, being rollable, being foldable, being stretchable, and being curved. In some embodiments, the OLED is transparent or semi-transparent. In some embodiments, the OLED further comprises a layer comprising carbon nanotubes.

In some embodiments, the OLED further comprises a layer comprising a delayed fluorescent emitter. In some embodiments, the OLED comprises a RGB pixel arrangement or white plus color filter pixel arrangement. In some embodiments, the OLED is a mobile device, a hand held device, or a wearable device. In some embodiments, the OLED is a display panel having less than 10 inch diagonal or 50 square inch area. In some embodiments, the OLED is a display panel having at least 10 inch diagonal or 50 square inch area. In some embodiments, the OLED is a lighting panel.

In some embodiments of the emissive region, the emissive region further comprises a host.

In some embodiments, the compound can be an emissive dopant. In some embodiments, the compound can produce emissions via phosphorescence, fluorescence, thermally activated delayed fluorescence, i.e., TADF (also referred to as E-type delayed fluorescence), triplet-triplet annihilation, or combinations of these processes.

The OLED disclosed herein can be incorporated into one or more of a consumer product, an electronic component module, and a lighting panel. The organic layer can be an emissive layer and the compound can be an emissive dopant in some embodiments, while the compound can be a non-emissive dopant in other embodiments.

The organic layer can also include a host. In some embodiments, two or more hosts are preferred. In some embodiments, the hosts used maybe a) bipolar, b) electron transporting, c) hole transporting or d) wide band gap materials that play little role in charge transport. In some embodiments, the host can include a metal complex. The host can be an inorganic compound.

Combination with Other Materials

The materials described herein as useful for a particular layer in an organic light emitting device may be used in combination with a wide variety of other materials present in the device. For example, emissive dopants disclosed herein may be used in conjunction with a wide variety of hosts, transport layers, blocking layers, injection layers, electrodes and other layers that may be present. The materials described or referred to below are non-limiting examples of materials that may be useful in combination with the compounds disclosed herein, and one of skill in the art can readily consult the literature to identify other materials that may be useful in combination.

Various materials may be used for the various emissive and non-emissive layers and arrangements disclosed herein. Examples of suitable materials are disclosed in U.S. Patent Application Publication No. 2017/0229663, which is incorporated by reference in its entirety.

Conductivity Dopants:

A charge transport layer can be doped with conductivity dopants to substantially alter its density of charge carriers, which will in turn alter its conductivity. The conductivity is increased by generating charge carriers in the matrix material, and depending on the type of dopant, a change in the Fermi level of the semiconductor may also be achieved. Hole-transporting layer can be doped by p-type conductivity dopants and n-type conductivity dopants are used in the electron-transporting layer.

HIL/HTL:

A hole injecting/transporting material to be used in the present invention is not particularly limited, and any compound may be used as long as the compound is typically used as a hole injecting/transporting material.

EBL:

An electron blocking layer (EBL) may be used to reduce the number of electrons and/or excitons that leave the emissive layer. The presence of such a blocking layer in a device may result in substantially higher efficiencies, and or longer lifetime, as compared to a similar device lacking a blocking layer. Also, a blocking layer may be used to confine emission to a desired region of an OLED. In some embodiments, the EBL material has a higher LUMO (closer to the vacuum level) and/or higher triplet energy than the emitter closest to the EBL interface. In some embodiments, the EBL material has a higher LUMO (closer to the vacuum level) and or higher triplet energy than one or more of the hosts closest to the EBL interface. In one aspect, the compound used in EBL contains the same molecule or the same functional groups used as one of the hosts described below.
Host:

The light emitting layer of the organic EL device of the present invention preferably contains at least a metal complex as light emitting material, and may contain a host material using the metal complex as a dopant material. Examples of the host material are not particularly limited, and any metal complexes or organic compounds may be used as long as the triplet energy of the host is larger than that of the dopant. Any host material may be used with any dopant so long as the triplet criteria is satisfied.
HBL:

A hole blocking layer (HBL) may be used to reduce the number of holes and/or excitons that leave the emissive layer. The presence of such a blocking layer in a device may result in substantially higher efficiencies and/or longer lifetime as compared to a similar device lacking a blocking layer. Also, a blocking layer may be used to confine emission to a desired region of an OLED. In some embodiments, the HBL material has a lower HOMO (further from the vacuum level) and or higher triplet energy than the emitter closest to the HBL interface. In some embodiments, the HBL material has a lower HOMO (further from the vacuum level) and or higher triplet energy than one or more of the hosts closest to the HBL interface.
ETL:

An electron transport layer (ETL) may include a material capable of transporting electrons. The electron transport layer may be intrinsic (undoped), or doped. Doping may be used to enhance conductivity. Examples of the ETL material are not particularly limited, and any metal complexes or organic compounds may be used as long as they are typically used to transport electrons.
Charge Generation Layer (CGL)

In tandem or stacked OLEDs, the CGL plays an essential role in the performance, which is composed of an n-doped layer and a p-doped layer for injection of electrons and holes, respectively. Electrons and holes are supplied from the CGL and electrodes. The consumed electrons and holes in the CGL are refilled by the electrons and holes injected from the cathode and anode, respectively; then, the bipolar currents reach a steady state gradually. Typical CGL materials include n and p conductivity dopants used in the transport layers.

In an electronic OLED display, pixels may change their luminance and color at a rate that depends on the frame rate of the display. The switching speed of each pixel may be impacted by the intrinsic electronic processes of the OLED, such as the excited state lifetime, charge trapping kinetics in the OLED organic layers, and/or the circuit for each OLED device. When an OLED device is emitting light and is turned off, the rate at which the light output by the OLED decays to zero will may be determined by an external resistance across terminals of the OLED. If the terminals across the OLED are in an open circuit, the OLED device response time may be limited by the internal RC (resistor-capacitor) time constant and the response time of charge de-trapping from traps in the organic layers. This response time may be decreased by placing a low resistance external connection across the OLED device.

Embodiments of the disclosed subject matter may decrease the OLED response time. Experimental studies suggest the response time may be strongly dependent on the current density flowing through the OLED, with the response time (i.e., the rate at which the light output by the OLED decays to zero after it is turned off) increasing as the luminance of the OLED decreases from the previous "on" state. The current density may decrease at low-level illumination, which may have a negative impact on an OLED display response time, where the OLED display is operating at low brightness levels or low grey levels. Embodiments of the disclosed subject matter may increase the OLED current density and reduce the response time at low grey levels. Arrangements of the disclosed subject matter may improve grey scale level accuracy of OLEDs as OLED devices become more efficient and drive current becomes smaller and more difficult to supply with accuracy.

In an OLED display, it may be desirable to have an OLED stop emitting light quickly after its current is reduced to zero, or close to zero (i.e., as the OLED current approaches zero). Circuit conditions and/or charge trapping may prevent this from happening, which may produce an incorrect visual image when OLEDs are used in a display device.

To ensure that an OLED turns off, such that its emission is quickly turned off after the current through the OLED is turned off, embodiments of the disclosed subject matter may provide a low resistance path across the OLED, and/or ensure that the OLED does not have forward voltage across the terminals of the OLED. Embodiments of the disclosed subject matter may place a TFT across the OLED such that the TFT may be turned on for a short period after the OLED current has been turned off. This may ensure rapid discharge of charges trapped in the organic layers of the OLED and may reduce the device RC time constant. In most conventional pixel driving circuits, once the OLED driver TFT is turned off and current stops flowing through the OLED, the OLED is effectively an open circuit, often resulting in a slow decay of its light emission.

Embodiments of the disclosed subject matter may minimally impact display performance by ensuring that a drive circuit minimizes the consumption of power, minimizes and/or does not impact grey scale, is simple and does not use many additional metal lines, works with most multi-TFT pixel compensation circuits, and/or can be implemented with a plurality of TFT technologies, such as a-Si (amorphous silicon), IGZO (indium gallium zinc oxide), LTPS (low temperature polysilicon), LTPO (low temperature polycrystalline oxide), organic TFTs, carbon nanotube based TFTs, or the like with NMOS (n-channel metal oxide semiconductor) or PMOS (p-channel metal oxide semiconductor) devices.

Figure 3:
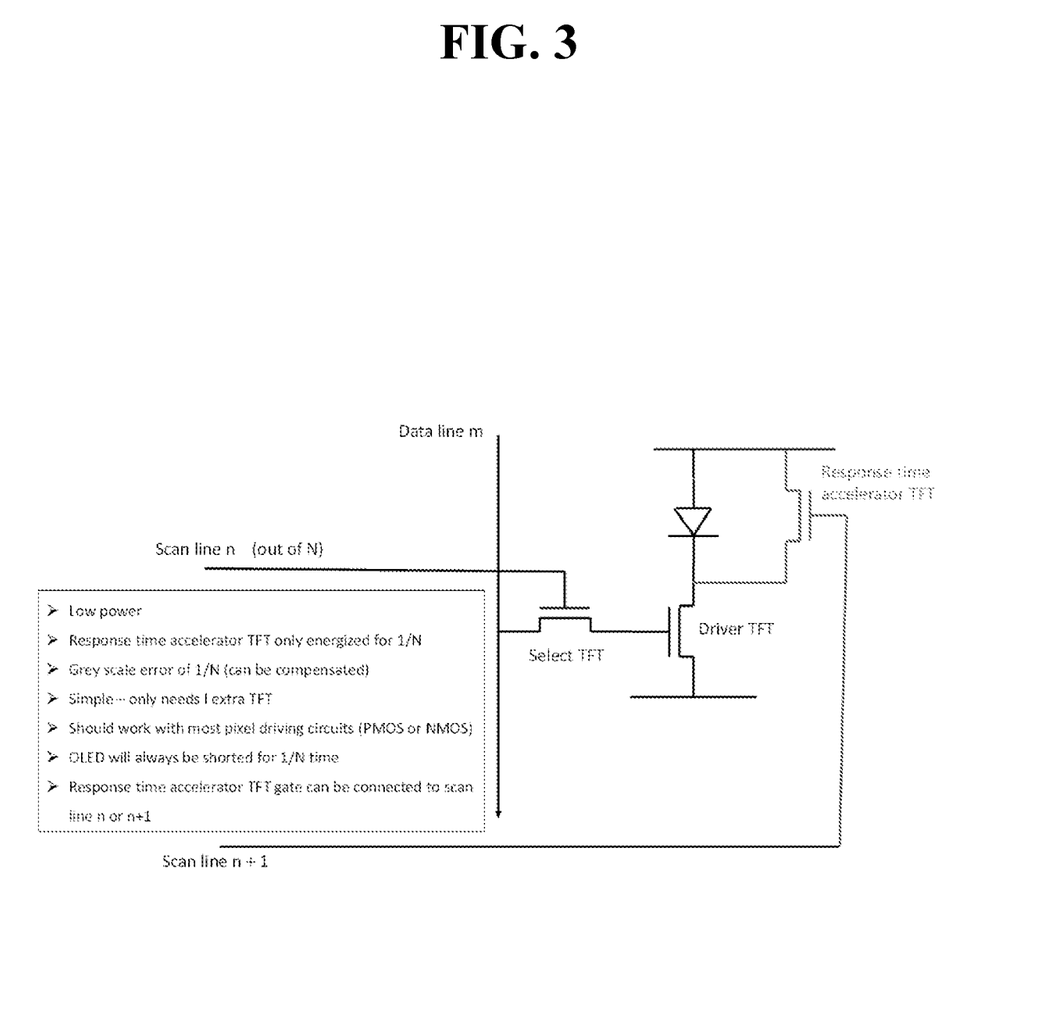
FIG. 3 shows a pixel driving circuit based on a two thin film transistor (TFT) drive arrangement, with an additional TFT to speed up the OLED response time from illumination to dark transition according to an embodiment of the disclosed subject matter.

FIG. 3 shows a pixel driving circuit based on a two TFT drive arrangement, with an additional a response time accelerator TFT configured to speed up the OLED response time for an illumination-to-dark transition according to an embodiment of the disclosed subject matter. The response time accelerator TFT may be energized by a scan line pulse from a subsequent scan line of, for example, an OLED display device.

In the circuit shown in FIG. 3, the pixel of an OLED display may be set with a luminance for the next frame time. When the next scan line is selected, the response time accelerator TFT from the previous scan line pixel may be turned on, which may short the OLED that includes the pixel. If the OLED has just been turned off, the response time accelerator TFT may cause a rapid drop in pixel luminance to minimize and/or prevent light being output when the pixel should be off (i.e., not emitting light). If the OLED is emitting light, then the response time accelerator TFT may minimize and/or prevent the pixel from emitting light while the subsequent scan line is energized, but the OLED may emit light at a predetermined value for the remainder of a frame time. If the display has N scan lines, there may be a small 1/N error in pixel luminance may be compensated for by adjusting drive currents.

The response time accelerator TFT may be connected to its own scan line, provided that the scan line pulse width is long enough to both turn off the OLED and then discharge it, thus reducing its luminance.

The electrical connections to the OLED cathode as shown in FIG. 3 may use a low resistance path in each pixel through the organic layers of the OLED that are part of the organic stack. There are several options for achieving this architecture. For example, high-resolution shadow masks may be used to deposit the organic layers. Typically, high-resolution fine metal masks (FFMs) are used when depositing the emissive layer (EML), electron blocking layer (EBL), and/or layer. These layers may be deposited prior to the deposition of the emissive layer (EML) of the OLED. Other layers within the device are typically "blanket deposited." In embodiments of the disclosed subject matter, if the organic layers in the OLED stack are deposited through an FMM, then the cathode may be configured to contact a connection on the substrate surface that may have been masked during the organic layer deposition. The cathode may be deposited through a different FMM, which is configured to cover the OLED active anode area and contact the electrical connector.

In another example, an integrated shadow mask (ISM) may be used, such as disclosed in U.S. Pat. No. 6,596,443, incorporated by reference in its entirety. ISMs have typically been used in passively addressed OLED displays to pattern the cathode into discreetly addressable rows. This technique, in combination with architecture described in the example above, may be used to pattern the cathode.

In yet another example, angled organic and/or cathode deposition sources may be used. Angular deposition, where sources may not be perpendicular to the substrate surface, may be used in conjunction with one or more of the example above to configure the cathode layer to contact the uncoated substrate electrical contact.

In another example, 'shorting' features on the TFT substrate surface may be used, such as those disclosed in U.S. Pat. No. 10,756,141, incorporated by reference herein in its entirety. The organic layers of an OLED may typically be 100-500 nm thick. Therefore, asperities on substrate surface of this order of thickness or more may "short" or "punch-through" these organic layers. That is, conductive asperities may be used to contact the electrical contact on the substrate to the cathode. For example, metal nanorods fabricated or deposited on the substrate surface of a predetermined height and/or length may be used. Another option to provide such features may be by using a heat treatment on a prepared metal surface to form "hillocks" in the pre-patterned metal contacts on the substrate surface.

In a further example, organic vapor jet printing (OVJP), ink jet printing (UP), laser-induced thermal imaging (LITI), or lithographic patterning of the OLED layers may be used to configure the cathode to contact a connector on the substrate surface.

As described above and shown in FIG. 3, electrical connections to the OLED cathode may be formed via a low resistance path in each pixel through the organic layers making up the organic stack. In some embodiments of the disclosed subject matter, the response time accelerator TFT may connect the OLED anode to another supply line or separate supply line which may be global to the whole display (e.g., which may be same potential for every pixel), so that the supply line has a low resistance to the common cathode connection (through electronics external to the array). This separate supply line may be at the cathode potential to short the OLED when the response time accelerator TFT is turned on, or at a lower potential so the OLED may be reverse biased when the response time accelerator TFT is turned on. The separate supply line may have a selected duty cycle, and may be global to the whole display.

Figure 4:
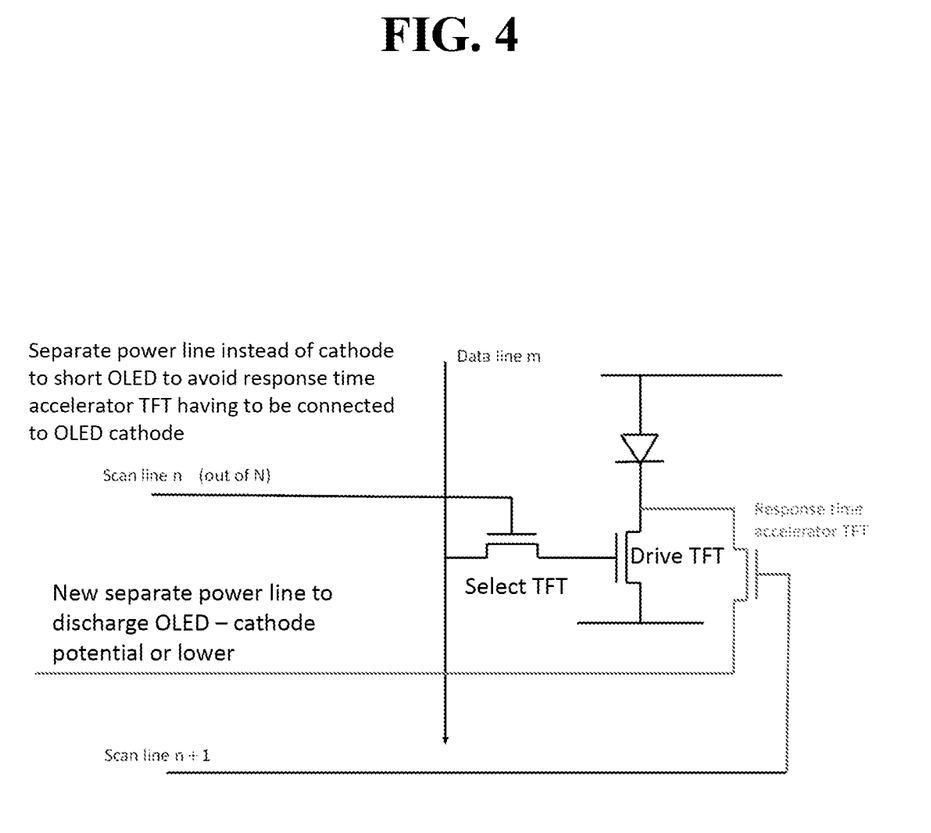
FIG. 4 shows another implementation of a pixel driving circuit based on the two TFT drive arrangement, with an additional TFT to speed up the OLED response time from illumination to dark transition according to an embodiment of the disclosed subject matter.

FIG. 4 shows another implementation of a pixel driving circuit based on the two TFT drive arrangement, with an additional TFT (i.e., a response time accelerator TFT) to speed up the OLED response time from illumination to dark transition according to an embodiment of the disclosed subject matter. In the arrangement shown in FIG. 4, the response time accelerator TFT may be connected to scan line n, scan line n+1, or another neighboring scan line.

The circuitry arrangements of the disclosed subject matter may be selectively used. For example, one or more color sub-pixels may use the circuitry arrangements, while other color sub-pixels may not use the circuitry. Different materials and/or colors of sub-pixels may have different trapping and/or de-trapping characteristics while in an open circuit. There may be different emissive layer transient times which may or may not use correction. In some embodiments, the additional circuitry described herein may not be needed for all colors of sub-pixel in the display. For example, this circuitry may be used in a white sub-pixel arrangement, a yellow sub-pixel arrangement, in a green sub-pixel arrangement, in a blue sub-pixel arrangement, and/or in a red sub-pixel arrangement, or in a combination of sub-pixel arrangements. In some embodiments, the circuitry of the disclosed subject matter may be used with two different colors of sub-pixels. In some embodiments, the circuitry of the disclosed subject matter may be used with three different colors of sub-pixels. Where the circuitry is for more than one color of sub-pixels, the properties of the TFTs may be different for each color of sub-pixel.

OLED displays are becoming more efficient using, for example, PHOLED blue sub-pixels, no circular polarizers, improved outcoupling devices, and the like. The increased efficiency may lower the drive currents that may be provided to OLED devices to produce light to be outputted by the device. The increased efficiency may have at least two considerations: (1) the actual drive currents may become very small, and thus may be difficult to control accurately; and (2) the OLED response time under open circuit conditions t may depend on the drive current J such that $\tau = K/J^n$ where K is a constant and n is approximately 1.6.

That is, very low drive currents (i.e., drive currents below a predetermined threshold level) may lead to long transient response times, which may negatively impact display visual performance.

Embodiments of the disclosed subject matter may increase the drive current to an OLED device in an OLED sub-pixel. At low light levels, the current density flowing through the OLED may be increased and reduce the open circuit transient response time.

Embodiments of the disclosed subject matter may increase OLED current density at low light levels, maintain and/or reduce OLED display power consumption, and/or maintain and/or increase OLED lifetimes without changing the OLED device structure. These may be achieved by reducing the active emission area and/or duty cycle at low grey levels.

Figure 5:
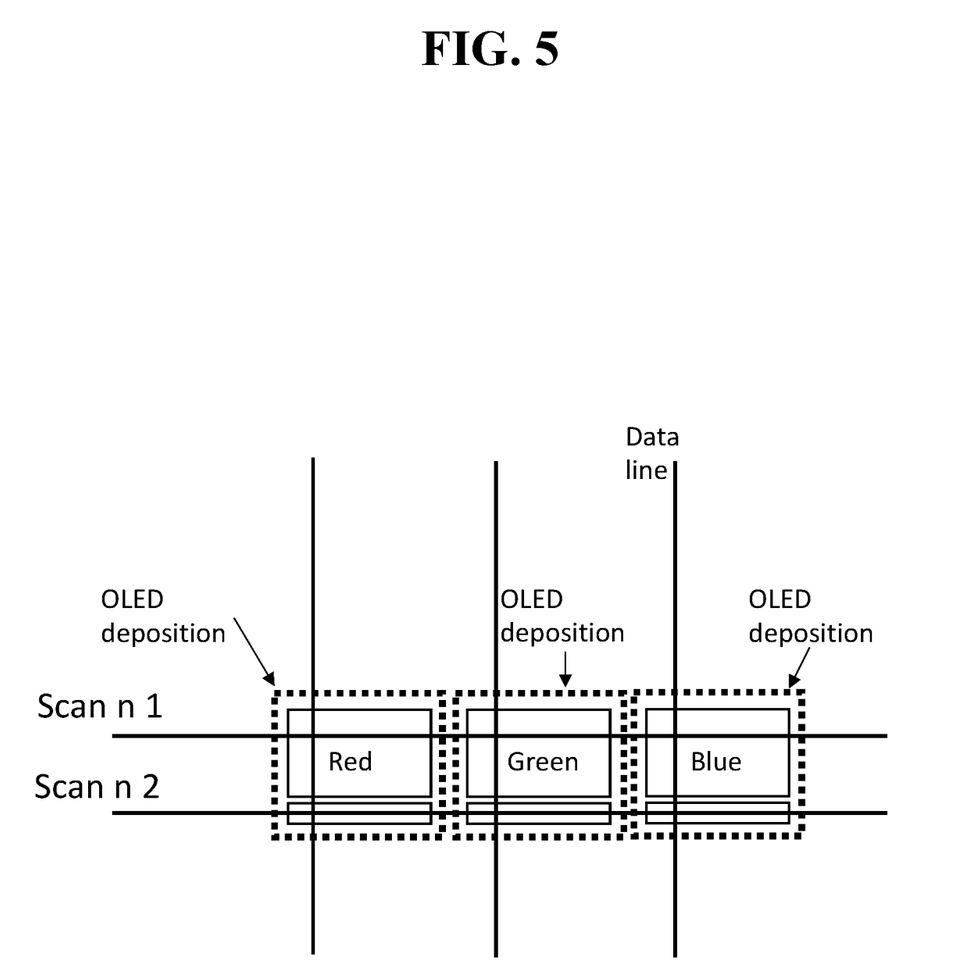
FIG. 5 shows subpixel layout to increase OLED drive current at low drive currents, where each OLED emissive area may have two active areas driven by different scan lines but the same data line according to an embodiment of the disclosed subject matter.

FIG. 5 shows a sub-pixel layout to increase OLED drive current at low drive currents according to an embodiment of the disclosed subject matter. Each OLED emissive area may have two active areas that driven by different scan lines, but the same data line. The pixel arrangement shown in FIG. 5 may be used to reduce the emission area at luminance levels that are less than a predetermined maximum level for a sub-pixel, where each color sub-pixel may have two (or more) emission areas within the same deposition area. These two or more emissive areas may be independently addressed, with each having its own scan line or select line and using the same data line. Each emissive area may have its own backplane driving circuit, based on scan line and data line inputs. In some embodiments, one OLED deposition may be used, with two or more independent OLED anode contacts that are lithographically defined in the backplane. That is, the separation between the two or more emissive areas may be determined by lithography, and not by OLED deposition processes. The separation of the two emissive areas may be small (e.g., <5 µm, <2 µm, or the like) to minimize reductions in the overall subpixel fill-factor. In some embodiments, more than two emissive areas may be used with the above-described arrangement. The smaller emission area may be less than 50%, less than 25%, less than 10%, less than 5%, or the like of the area of the overall emissive area (i.e., the combination of both emissive areas).

In the embodiments described above, such as those in connection with FIGS. 3-5, the OLEDs may be inverted, so the cathode of the OLED is disposed at the bottom, such as in the arrangement shown in FIG. 2, where the cathode 215 is disposed at the bottom of the OLED 200. This may contrast with the OLED arrangement shown in FIG. 1, where the cathode 160 is disposed at the top of OLED 100.

When it is desirable to have the sub-pixel to have light output near its maximum design level (for example, if a display can produce 1,000 cd/m² white light output, then for light outputs greater than 10% of the maximum 1,000 cd/m²) both emission areas may be used to produce light output at the same luminance. These example luminance values are similar to using one emissive area in a conventional display. That is, embodiments of the disclosed subject matter do not have an increase in power consumption and/or reduction in OLED lifetime when compared to a conventional display.

For example, when it is desirable to have OLED light output be less than 10% of a maximum light output value (e.g., a desired luminance level), a controller may start to shut off the larger emissive area of the OLED and energize the smaller area with a higher OLED current to achieve the desired luminance than would be possible than by just using the larger emissive area. As the overall subpixel luminance is low, there may be no significant power losses (i.e., power losses above a predetermined amount) and/or reduction in lifetime of the OLED. The controller may control the OLED so that above X % of the maximum sub-pixel luminance, both emissive areas emit light. In this example, the controller may control the OLED so that below Y % of the maximum sub-pixel luminance, only the smaller area emits light. The controller may control the OLED so that between Y % and X %, the different areas may emit light at different intensities. The controller may determine and output data signals to the drive circuits that may control each emissive area. In the example above, X may be 10%-100% of the maximum sub-pixel luminance, and Y may be 0 to 50% of the maximum sub-pixel luminance.

Embodiments of the disclosed subject matter may use two different scan lines to control the luminance of each sub-pixel emissive area. Some embodiments may use one scan line, along with two different data lines.

In embodiments of the disclosed subject matter, different colors may be emitted from the different regions of, for example, the green sub-pixels, red sub-pixels, and/or the blue sub-pixels. The color of light may be different by using a different microcavity in each region, color filters, quantum dots, or the like.

Embodiments of the disclosed subject matter may increase OLED current density at low luminance levels. For example, the OLED power supply rail may be switched so that the OLED is on for a portion of time, such as a 10% duty cycle. In this example, while the OLED is energized, the luminance of the OLED may be ten times that of its value when compared to when it operates at 100% continuous operation.

As the eye is most sensitive to green and/or yellow light in terms of luminance, as opposed to blue or red light, embodiments of the disclosed subject matter may have different sized green sub-pixels. For example, each pixel may have a full-sized blue and red sub-pixels, along with two independently controllable green sub-pixels. In this example, one emissive area may be for red and blue sub-pixels, but there is more than one emissive area for the green sub-pixels. The green-sub-pixels may be deposited at the same time. One of the green sub-pixels may be larger than the other green sub-pixel (e.g., one green sub-pixel may be ten times the size of the other green sub-pixel). As each pixel in this example may have four sub-pixels, an arrangement with two scan lines and two data lines per pixel may be used to drive the four sub-pixels.

In some embodiments, the drive current and/or brightness of sub-pixels may be increased at low luminance by lower the image resolution in a region where the light output is low. That is, the subpixels may operate at low drive currents (e.g., a drive current below a predetermined current value). For example, a controller may only energize every fourth green sub-pixel to have half of the effective resolution in the x- and y-direction. In this example, each sub-pixel may be energized at four times the luminance compared to the standard case of all sub-pixels energized. This embodiment may not include any changes to the hardware of the display or changes to the pixel stack design, but changes may be made to how the sub-pixels are controlled.

As discussed above, a transient time of an OLED may be set by the time it takes charges to recombine or be released, rather than any other process in the OLED. The slow discharge time of an OLED when driven at low current density may arise from when charge mobilities at low voltages are controlled by traps. The charge mobility at low voltage is often much lower than the charge mobility of the same device at higher voltage. This may be due to the fact that at lower voltage, more traps are unfilled and the traps may be, on average, deeper in energy with longer release times.

In an embodiment of the disclosed subject matter, the charge mobility of the OLED device may be increased without modifying the current density that the OLED is operated at when emitting light. In this embodiment, the OLED may be operated at a voltage above 0V, but below luminance turn-on during the 'off' part of the duty cycle. Running the OLED at low voltage during the 'off' part of the duty cycle fills charge traps in the OLED. Thus, when the OLED goes to discharge after being in the on state, the charges may be less deeply trapped on average and be able to discharge more quickly. Faster discharge may result in a faster observed transient response. Additional methods of generating a very small current through the OLED during the 'off' cycle may speed up the transient response. In these cases, the luminance emitted by the device may be approach zero.

The above-described FIGS. 3-5 may include a plurality of different embodiments. According to an embodiment, such as shown in FIG. 3 and described above, a device may include an organic light emitting device (OLED). The device may include a drive circuit to control the operation of the OLED, having a response time accelerator thin film transistor (TFT) configured to short or reverse bias the OLED for a predetermined period of time during a frame time, which may be a time to display at least a portion of an image on the device.

The OLED may have a voltage that is greater than or equal to zero volts when the response time accelerator TFT shorts or reverse biases the OLED.

Embodiments of the disclosed subject matter may be applied to any device having an emissive layer that includes traps, where an emissive layer may include quantum dots.

As shown in FIG. 3, the drive control circuit may include a selection thin film transistor (TFT) that is coupled to a data line and a first scan line, and a driver TFT that is coupled to the select TFT and the OLED. The response time accelerator TFT may be connected in parallel to the OLED, and connected in series with the driver TFT, and connected to a second scan line. The response time accelerator TFT may be configured to be energized by a scan line pulse to the second scan line of the device. The second scan line may be a scan line before the first scan line, a scan line after the first scan line, a scan line adjacent to the first scan line, and/or a scan line within a predetermined distance from the first scan line.

The OLED may include one or more pixels, with each pixel having one or more sub-pixels, and the response time accelerator TFT may be configured to decrease luminance of the one or more sub-pixels by shorting, partially shorting, reverse-biasing, or placing a predetermined or controllable low resistance across the OLED, and/or the response time accelerator TFT may be configured to reduce an amount of light emitted from the one or more sub-pixels when the second scan line is energized. The response time accelerator TFT may reduce subsequent light output from the OLED after shorting, partially shorting, reverse biasing, or placing a predetermined or controllable low resistance across the OLED for the period it is energized.

The drive circuitry, such as shown in FIG. 3, may be configured to control at least one sub-pixel of the OLED that is configured to emit white light, at least one sub-pixel of the OLED configured to emit yellow light, at least one sub-pixel to emit green light, at least one sub-pixel to emit blue light, and/or at least one sub-pixel configured to emit cyan light.

The drive circuitry, such as shown in FIG. 3, may be configured to control at least two sub-pixels that include a first sub-pixel configured to emit a light having a first color and a second sub-pixel configured to emit light having a second color. The drive circuitry may be configured to control at least three sub-pixels that include a first sub-pixel configured to emit a light having a first color, a second sub-pixel configured to emit light having a second color, and a third sub-pixel configured to emit light having a third color.

The OLED may include a plurality of pixels, where each pixel includes a first sub-pixel, a second sub-pixel, and at least one third sub-pixel. The drive circuit, such as shown in FIG. 3, may be configured to control a portion of the first sub-pixels of the plurality of pixels to output light.

As shown in FIG. 4, the drive circuit may include a selection thin film transistor (TFT) that is coupled to a data line and a first scan line, and a driver TFT that is coupled to the select TFT and the OLED. The response time accelerator TFT may be connected in parallel with the driver TFT, may be connected in series with the OLED, connected to a separate power line which may be global for a display, and may be connected to a second scan line. That is, the separate supply line may have a duty cycle, and may be global to the whole display. The OLED may have a voltage that is greater than or equal to zero volts when the response time accelerator TFT shorts or reverse biases the OLED. The response time accelerator TFT may be configured to be energized by a scan line pulse to the second scan line of the device. The second scan line may be a scan line before the first scan line, a scan line after the first scan line, a scan line adjacent to the first scan line, and/or a scan line within a predetermined distance from the first scan line. The OLED may have a plurality of pixels, where each pixel includes a first sub-pixel, a second sub-pixel, and at least one third sub-pixel, and the drive circuit may be configured to control a portion of the first sub-pixels of the plurality of pixels to output light.

The embodiment shown in FIG. 5 may have a device that may include an organic light emitting device (OLED) having a plurality of sub-pixels, where one or more of sub-pixels configured to emit light of at least a first color comprises a first emissive area and a second emissive area that are independently controllable. A controller may be configured to control the first emissive area and the second emissive area, wherein the first emissive area is larger than the second emissive area. The controller may be configured to control the second emissive area to have (i) a higher brightness, and/or (ii) a higher current density than the first emissive area for a first sub-pixel luminance level that is less than a maximum luminance.

At least one sub-pixel of the plurality of sub-pixels may be configured to emit at least one of white light, yellow light, green light, blue light, and/or cyan light.

Each pixel of the plurality of pixels may have at least three sub-pixels, where the emissive areas within each of the at least three sub-pixels are independently controllable. The controller may be configured to control the second emissive area to have a higher brightness than the first emissive area for a first luminance level that is less than a maximum luminance.

In some embodiments, each emissive area within a sub-pixel may use the same emissive layer. Each emissive layer in the same sub-pixel may be deposited at the same time using the same patterning process.

The device of the embodiment shown in FIG. 5 may include a plurality of scan lines, where each emissive area in the same sub-pixel is addressed from a separate scan line of the plurality of scan lines.

The device may include a plurality of data lines, where each emissive area in the same sub-pixel is addressed from a separate data line. Each emissive area in the same sub-pixel of the device may be powered by its own power supply line. The controller may be configured to control a duty cycle of the power supply line to control when the sub-pixel is turned on.

The second emissive area of the OLED may be powered by a voltage supply which is pulsed with a duty cycle less than 100%.

The first emissive area and the second emissive area of the device may form a total emissive area. The second emissive area may be less than 50% of the total emissive area, less than 25% of the total emissive area, less than 10% of the total emissive area, and/or less than 5% of the total emissive area.

The controller of the device of FIG. 5 may be configured to control the amount of light output by the OLED, and may be configured to turn off the first emissive area and emit light from the second emissive area when less than a predetermined amount of the maximum luminance.

The controller of the device of FIG. 5 may be configured to control the first emissive area and the second emissive area to output light above a first percentage of a maximum sub-pixel luminance, configured to control the second emissive area to output light below a second percentage of the maximum sub-pixel luminance, and/or configured to control the first emissive area and the second emissive area to output light at different intensities when between the first percentage and second percentage of maximum luminance. The first percentage of the maximum sub-pixel luminance may be between 10%-100%, and the second percentage of the maximum sub-pixel luminance may be 0-50%.

The controller of the device may be configured to control the first emissive area, and/or the second emissive area of a sub-pixel to be energized for less than a complete frame time.

The device may include a separate power line to the OLED, where the controller may be configured to control to duty cycle to be a less than 100% duty cycle, a less than 50% duty cycle, a less than 25% duty cycle, a less than 10% duty cycle, and/or a less than 5% duty cycle. At least one of the first emissive area and/or the second emissive area may be powered by: (i) a constant power supply rail, and/or (ii) the separate power line having the selected duty cycle. For example, in some embodiments, both the first and second emissive areas may be powered by the separate power line having the selected duty cycle. The separate supply line having the selected duty cycle may be global to a whole display.

Different colors of light may be emitted from the at least two emission areas of a green sub-pixel, a red sub-pixel, and/or a blue sub-pixel. In some embodiments, different colors may be formed from a different microcavity, one or more color altering layers, and/or quantum dots.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

We claim:

1. A device comprising:
an organic light emitting device (OLED) having a plurality of sub-pixels, where one or more sub-pixels of the plurality of sub-pixels comprise:
a first emissive area and a second emissive area that are in a same sub-pixel of the one or more sub-pixels and are independently controllable; and
a controller to control the first emissive area and the second emissive area,
wherein the first emissive area is larger than the second emissive area, and
wherein the controller is configured to control the second emissive area to have at least one selected from a group consisting of: (i) a higher brightness, and (ii) a higher current density than the first emissive area for a first sub-pixel luminance level that is less than a maximum luminance,
wherein each emissive area in the same sub-pixel is powered by its own power supply line,
wherein the first emissive area and the second emissive area are configured to emit the same emissive spectrum, and
wherein the emissive spectrum of light emitted out of the device from a sub-pixel is the same whether the light is emitted from the first emissive area or the second emissive area in the sub-pixel.

2. The device of claim 1, further comprising:
a plurality of data lines,
wherein each emissive area in the same sub-pixel is addressed from a separate data line.

3. The device of claim 1, wherein the first emissive area and the second emissive area form a total emissive area, and
wherein the second emissive area is at least one selected from the group consisting of: less than 50% of the total emissive area, less than 25%, of the total emissive area, less than 10% of the total emissive area, and less than 5% of the total emissive area.

4. The device of claim 1, wherein the controller is configured to control the amount of light output by the OLED, and
wherein the controller is configured to turn off the first emissive area and emit light from the second emissive area when less than a predetermined amount of the maximum luminance.

5. The device of claim 1, wherein the controller is configured to control the first emissive area and the second emissive area to output light above a first percentage of a maximum sub-pixel luminance, configured to control the second emissive area to output light below a second percentage of the maximum sub-pixel luminance, and configured to control the first emissive area and the second emissive area to output light at different intensities when between the first percentage and second percentage of maximum luminance.

6. The device of claim 5, wherein the first percentage of the maximum sub-pixel luminance is between 10%-100%, and the second percentage of the maximum sub-pixel luminance is 0-50%.

7. The device of claim 1, wherein the controller is configured to control at least one selected from the group consisting of: the first emissive area, and the second emissive area of a sub-pixel to be energized for a portion of a frame time less than a complete frame time.

8. The device of claim 7, further comprising:
a separate power line to the OLED, wherein the controller controls to duty cycle to be at least one selected from the group consisting of: a less than 100% duty cycle, a less than 50% duty cycle, a less than 25% duty cycle, a less than 10% duty cycle, and a less than 5% duty cycle.

9. The device of claim 8, wherein at least one selected from the group consisting of: the first emissive area, and the second emissive area is powered by the separate power line having the selected duty cycle.

10. The device of claim 1, wherein the device is at least one type selected from the group consisting of: a flat panel display, a curved display, a computer monitor, a medical monitor, a television, a billboard, a light for interior or exterior illumination and/or signaling, a heads-up display, a fully or partially transparent display, a flexible display, a rollable display, a foldable display, a stretchable display, a laser printer, a telephone, a cell phone, tablet, a phablet, a personal digital assistant (PDA), a wearable device, a laptop computer, a digital camera, a camcorder, a viewfinder, a micro-display that is less than 2 inches diagonal, a 3-D display, a virtual reality or augmented reality display, a vehicle, a video walls comprising multiple displays tiled together, a theater or stadium screen, and a sign.

11. The device of claim 1, wherein at least one sub-pixel of the plurality of sub-pixels is configured to emit at least one selected from the group consisting of: white light, yellow light, green light, blue light, and cyan light.

12. The device of claim 1, wherein each pixel of the plurality of pixels has at least three sub-pixels, wherein the emissive areas within each of the at least three sub-pixels are independently controllable,
wherein the controller is configured to control the second emissive area to have a higher brightness than the first emissive area for a first luminance level that is less than a maximum luminance.

13. The device of claim 1, wherein each emissive layer in the same sub-pixel is deposited at the same time using the same patterning process.

14. The device of claim 1, further comprising:
a plurality of scan lines,
wherein each emissive area in the same sub-pixel is addressed from a separate scan line of the plurality of scan lines.

15. The device of claim 1, wherein the controller controls a duty cycle of the power supply line to control when the sub-pixel is turned on.

16. The device of claim 1, wherein the second emissive area of the OLED is powered by a voltage supply which is pulsed with a duty cycle less than 100%.

17. The device of claim 1, wherein different colors of light are emitted from the at least two emission areas of at least one selected from a group consisting of: a green sub-pixel, a red sub-pixel, and a blue sub-pixel.

18. The device of claim 17, wherein different colors are formed from at least one selected from the group consisting of: a different microcavity, one or more color altering layers, and quantum dots.

19. The device of claim 1, wherein the first emissive area emits a first light from the device and the second emissive area emits a second light from the device and wherein the first light and the second light are the same emissive spectrum.

20. The device of claim 1, wherein the first emissive area and the second emissive are a same emissive layer deposited via a single deposition.

* * * * *